(12) United States Patent
Schnellbach et al.

(10) Patent No.: US 11,065,800 B2
(45) Date of Patent: Jul. 20, 2021

(54) GRANULATOR, NOZZLE ARRANGEMENT FOR A GRANULATOR, AND RELEVANT OPERATING METHOD

(71) Applicant: NORDSON CORPORATION, Westlake, OH (US)

(72) Inventors: Nikolai Schnellbach, Senden (DE); Kamal Eljouhari, Münster (DE); Anatoly Baklashov, Münster (DE); Dirk Schlief, Dülmen (DE)

(73) Assignee: Nordson Corporation, Westlake, OH (US)

( * ) Notice: Subject to any disclaimer, the term of this patent is extended or adjusted under 35 U.S.C. 154(b) by 216 days.

(21) Appl. No.: 16/241,399

(22) Filed: Jan. 7, 2019

(65) Prior Publication Data

US 2019/0217520 A1 Jul. 18, 2019

(30) Foreign Application Priority Data

Jan. 12, 2018 (EP) ..................................... 18151470

(51) Int. Cl.
*B29C 48/345* (2019.01)
*B29B 9/06* (2006.01)
*B29C 48/05* (2019.01)
*B29C 48/30* (2019.01)
*B29C 48/00* (2019.01)
(Continued)

(52) U.S. Cl.
CPC ............ *B29C 48/345* (2019.02); *B29B 9/065* (2013.01); *B29C 48/0022* (2019.02); *B29C 48/05* (2019.02); *B29C 48/2556* (2019.02); *B29C 48/30* (2019.02); *B29C 48/695* (2019.02); *B29B 9/06* (2013.01); *B29C 48/255* (2019.02); *B29C 48/2562* (2019.02); *B29C 2948/92866* (2019.02); *B29K 2101/12* (2013.01)

(58) Field of Classification Search
CPC .............. B29C 48/345; B29C 48/0022; B29C 48/2556; B29C 48/30; B29C 48/695; B29C 48/05; B29C 48/255; B29C 48/2562; B29C 2948/92866; B29B 9/065; B29B 9/06; B29K 2101/12
USPC ....................................................... 425/464
See application file for complete search history.

(56) References Cited

U.S. PATENT DOCUMENTS 5,948,336 A 9/1999 Yoshida et al.
2005/0140044 A1* 6/2005 Jackson ................... B29B 9/06
264/142

(Continued)

FOREIGN PATENT DOCUMENTS

DE 4408235 C1 2/1995
DE 19720722 A1 11/1998
(Continued)

*Primary Examiner* — Joseph S Del Sole
*Assistant Examiner* — Lawrence D. Hohenbrink, Jr.
(74) *Attorney, Agent, or Firm* — BakerHostetler (57) ABSTRACT

A nozzle arrangement for a granulator has a nozzle body with an inlet side as well as an outlet side, a nozzle plate with nozzle holes arranged on the outlet side for forming melt strands, and flow channels formed in the nozzle body and connected to the inlet side and the outlet side in a fluid-conducting manner for supplying a melt flow to a nozzle plate. An annular connection channel connects a plurality of flow channels in a fluid-conducting manner. A method for separating a melt flow into melt strands is also described.

22 Claims, 11 Drawing Sheets

(51) Int. Cl.
  *B29C 48/255*  (2019.01)
  *B29C 48/695*  (2019.01)
  *B29C 48/25*  (2019.01)
  *B29K 101/12*  (2006.01)

(56) References Cited

U.S. PATENT DOCUMENTS

| | | |
|---|---|---|
| 2006/0204604 A1 | 9/2006 | Yamanaka et al. |
| 2007/0264379 A1 | 11/2007 | Broughman |
| 2014/0328961 A1* | 11/2014 | Fridley .................. B29C 48/05 425/68 |
| 2015/0099023 A1* | 4/2015 | Murb ...................... B29B 9/065 425/67 |
| 2017/0305026 A1 | 10/2017 | Lemonnier et al. |

FOREIGN PATENT DOCUMENTS

| | | |
|---|---|---|
| EP | 1607200 A1 | 12/2005 |
| WO | 2016/043694 A1 | 3/2016 |

\* cited by examiner

GRANULATOR, NOZZLE ARRANGEMENT FOR A GRANULATOR, AND RELEVANT OPERATING METHOD

CROSS-REFERENCE TO RELATED APPLICATIONS

This application claims priority to European Patent App. No. 18151470.4, filed Jan. 12, 2018, the entire contents of which are incorporated herein by reference.

TECHNICAL FIELD

The invention relates to a nozzle arrangement for a granulator having a nozzle body with an inlet side as well as an outlet side, a nozzle plate with nozzle holes arranged on the outlet side for forming melt strands, and flow channels formed in the nozzle body and connected to the inlet side and the outlet side in a fluid-conducting manner for supplying a melt flow to a nozzle plate.

BACKGROUND

These types of nozzle arrangements are known in prior art and are used in granulators, for example. They are used to extrude melted granulate material, for example thermoplastic plastics, in most cases in the form of a plurality of melt strands, by means of a nozzle plate. Within the scope of the process of what is known as underwater granulation, the individual melt strands are subsequently subdivided by means of a cutting device into strand sections which, upon coming into contact with a coolant fluid, for example water, are cooled and thus form the desired granulates or granules. The method of underwater granulation allows a high throughput of granulation material with low requirements in terms of installation space for such equipment, and with low emissions in the form of dust or noise.

With the nozzle arrangements previously known from prior art, the melt is guided into a nozzle body on an inlet side. The melt is guided through the nozzle body and arrives at a nozzle plate by means of a plurality of flow channels. The nozzle plate typically has a plurality of nozzle holes in order to achieve a high level of productivity and, as a function of the melt to be processed, a desired granulation result, for example high throughputs with a comparatively small perforated plate or particularly small granules for a given throughput. Since, with the nozzle arrangements previously known from prior art, a discrete number of flow channels is formed in the nozzle bodies, consideration must be given to the arrangement of these flow channels in the design of the nozzle plate. It must be ensured that the nozzle holes of the nozzle plate are uniformly supplied with melt. Naturally, the arrangement of individual flow channels results in said channels being spaced apart from one another by housing sections. The nozzle holes in the nozzle plate may therefore be arranged only in limited areas on the nozzle plates, namely in particular in those that correspond with the outlets of the flow channels.

On the whole, this has a disadvantageous effect on the overall achievable material or melt throughput, and the form, quantity and positioning of the nozzle holes thus also have strict design limits imposed upon them. Under circumstances, the design of such a nozzle plate cannot be optimally adapted to the downstream cutting device which is used to divide the melt strands. A further disadvantage of the nozzle arrangements previously known from prior art comes to light in particular if different properties, for example melts or materials having viscosities or densities, are to be processed with a nozzle arrangement. Typically, each material or each melt is to be processed with advantageous process parameters, for example a specified processing pressure, in order to ensure that the melt strands leave the nozzle plate in a desired, for example uniform manner. With nozzle arrangements that are known previously from prior art, material changes typically result in the whole nozzle arrangement being exchanged and in different nozzle arrangements being held in readiness for each material to be processed, or at least for material groups. If different materials should be processed, this results in a high capital commitment since a plurality of nozzle arrangements need to be kept on hand. Moreover, exchanging a nozzle arrangement is time-consuming.

SUMMARY

Against this background, the underlying object of the invention was to develop a nozzle arrangement of the type described above such that the disadvantages found in prior art are remedied as much as possible. In particular, a nozzle arrangement was to be specified which improves the supply of melt to a nozzle plate and which can be operated with a plurality of different materials or melts.

According to the invention, the object is achieved with a nozzle arrangement of the aforementioned type via at least one annular connection channel which connects a plurality of flow channels in a fluid-conducting manner and is connected in a fluid-conducting manner to the nozzle holes in the nozzle plate. The invention makes use of the realization that melt can be more uniformly supplied to a nozzle plate by means of an annular connection channel which connects a plurality of flow channels in a fluid-conducting manner, and a pressure equalization between flow channels is enabled. This allows the outlet openings of a nozzle plate arranged on the nozzle body to be more flexibly designed with respect to form, quantity and positioning. As a result of the fact that the melt is not just selectively supplied to the nozzle plate by the annular connection channel, for instance through individual flow channels, but rather over a large area in a region defined by the annular channel, the open outlet area of the nozzle plate that is defined by the nozzle holes can be maximized. Overall, the nozzle plate can therefore be better adapted to the materials to be processed, and moreover the product throughput can be increased, e.g. by increasing the number of holes, and the quality of the granulates can be standardized.

According to a second aspect of the invention, or in accordance with an advantageous development of the invention according to the first aspect, it is proposed in accordance with the invention that the nozzle arrangement has at least one separate flow cross-section regulator which is arranged in the at least one flow channel between the connection channel and the nozzle plate. By means of such a flow cross-section regulator, the flow conditions in the flow channel can be influenced in a targeted manner. This is particularly advantageous if a plurality of different materials or melts are to be processed with one nozzle arrangement. The flow and pressure conditions in the flow channel, and in particular at the nozzle plate, can be influenced as desired by means of a targeted selection of such a separate flow cross-section regulator. A nozzle arrangement which can be used for a plurality of materials that are to be processed achieves cost advantages as compared to solutions in which the complete nozzle arrangement is to be exchanged every time the material is changed. Conversion times and set-up times can also be reduced since the exchange of such a flow cross-section regulator can typically be carried out significantly more quickly than the exchange of a complete nozzle arrangement.

The invention is thereby developed further in that the connection channel is designed at least in sections in the nozzle body. In this instance, "in sections" means that at least one subarea of the surrounding wall of the connection channel is formed in the nozzle body. The other areas of the surrounding wall of the connection channel may also be provided, for example by components provided for this purpose. A design of the connection channel at least in sections in the nozzle body has the advantage that the number of components used may as a result be kept low, which on the whole facilitates a fast assembly capability of the nozzle arrangement.

The connection channel preferably has an essentially circular cross-section. Such a circular cross-section has proven to be particularly advantageous with regard to the possibility for fluid exchange and pressure equalization between a plurality of flow channels. In particular, the cross-section facilitates uniform melt spreading along the annular connection channel.

The nozzle arrangement is preferably designed such that the diameter of the connection channel corresponds to a circular nozzle hole diameter of the nozzle plate. Therefore, this enables in particular not just that the nozzle holes of the nozzle plate are able to be arranged directly in that area in which, for instance, flow channels are open in the direction of the nozzle plate, but rather in a larger, in particular annular area, as a result of which the forms, quantity and positions of the nozzle holes may be selected distinctly more freely. In accordance with a further preferred embodiment, the annular connection channel is set up such that a fluid exchange is enabled in a plane parallel to the datum plane of the nozzle plate. It is also preferred that the flow channels are arranged in a circle or semicircle, the midpoint of which corresponds to a longitudinal axis of the nozzle arrangement.

In accordance with an alternative embodiment, it is preferred that the flow cross-section regulator is formed integrally on the nozzle plate. Therefore, the number of components to be used may be reduced.

Alternatively, it is preferred that the flow cross-section regulator is designed as a separate component. Furthermore, the nozzle arrangement is preferably designed such that the flow cross-section regulator is arranged in the flow channel so as to be interchangeable. Such an interchangeable arrangement enables a quick and easy exchange of the flow cross-section regulator, in particular if a different melt type or material type is to be processed with a nozzle arrangement and, for example, pressure conditions are to be altered.

In accordance with a preferred development, the flow cross-section regulator is designed as a ring element, in particular a throttle ring element. This type of embodiment of the flow cross-section regulator has been shown to be particularly advantageous with regard to influencing the flow cross-section in a targeted manner, as well as indirectly influencing the melt pressure. The ring elements are on the whole more cost-effective to produce and may be adapted to the desired intended use (material or melt type).

It is further preferred that the flow cross-section regulator is at least partially arranged in or adjacent to the connection channel. In conjunction with this, it has proven to be advantageous to influence the flow cross-section, and therefore indirectly the melt pressure, as closely as possible to the nozzle plate. Where a nozzle arrangement with connection channel is used, it is thus particularly advantageous to arrange or adapt the flow cross-section or melt pressure directly at the connection channel arranged adjacent to the nozzle plate.

In accordance with a further preferred development, the flow cross-section regulator is held in its position by the nozzle plate and is accessible after the removal of the nozzle plate. Since the nozzle plate is often to be exchanged as well when the material or melt is changed, this type of design structure supports a reduction in the retooling times since the flow cross-section regulator is directly accessible after the—often obligatory—removal of the nozzle plate, and can then be easily exchanged.

The invention is developed in that a blocking edge is formed at the flow cross-section regulator. Such a blocking edge has proven particularly suitable for influencing the free flow cross-section or for influencing the pressure conditions in the area of the nozzle plate. Such increased back-pressure results in a more uniform distribution of the melt, even given a non-uniform heating of the perforated plate, for example.

In accordance with a preferred development, at least one section of the connection channel is formed on the flow cross-section regulator. Therefore, the connection channel may be defined by means of a wall section, for example, which wall section is formed on the nozzle body, as well as by means of a wall section which is formed on the flow cross-section regulator. In this case as well, the aim is to reduce the total number of components required overall and, at the same time, to ensure that the connection channel remains accessible and serviceable, for example by removing the flow cross-section regulator.

It is further preferred that the nozzle arrangement has a distributor ring which is arranged between the nozzle plate and the flow cross-section regulator and on which a section of the connection channel is preferably formed. In the present case, the flow channel is therefore limited by wall sections that are associated with three components in total, namely the nozzle body, the flow channels, and a distributor ring. On the whole, advantages hereby result with regard to a modularized structure of such a nozzle arrangement.

The invention is thus developed in that the flow cross-section regulator has a conical section for limiting the flow channel. Additionally, or alternatively, the flow cross-section regulator further has a curved section for limiting the flow channel. These different embodiments of the flow cross-section regulator essentially serve to influence in a targeted manner the free flow cross-section, and therefore to influence in a targeted manner the material pressure or melt pressure as a function of the material to be processed. For example, to process a first material, a flow cross-section regulator which has a conical section for limiting the flow channel may be advantageous, whereas given use of a second material the use of a flow cross-section regulator with a concave section may be advantageous for limiting the flow channel. Furthermore, a combination of the specified forms is also possible, in particular as a function of the material to be processed.

In accordance with an alternative embodiment, the flow cross-section regulator is formed as a perforated flow cross-section regulator. It is further preferred that the perforated flow cross-section regulator has a wire netting. The free flow cross-section can therefore be influenced in the area of the flow cross-section regulator via the quantity, form and size of the perforations of the perforated flow cross-section regulator, as well as by the composition, for instance the number of holes and hole size, of the wire netting.

The invention has been described above with reference to a nozzle arrangement. In a further aspect, the invention relates to a granulator for producing granulates from a melt flow, said granulator having a nozzle arrangement. The invention achieves the object referred to above with regard to the granulator in that the nozzle arrangement is formed in accordance with one of the aforementioned aspects.

In a further aspect, the invention relates to a method for separating a melt flow into melt strands. The invention achieves the object referred to above with reference to a method having the following steps: supplying a melt flow to a nozzle arrangement, separating the melt flow into individual melt flows, pressure equalization between the plurality of individual melt flows by means of a ring channel, and supplying the at least one common melt flow to a nozzle plate. Reference is made to the above designs, and the same are included here, with regard to the advantages which such a granulator or such a method entails.

BRIEF DESCRIPTION OF THE DRAWINGS

Further features and advantages of the invention ensue from the attached claims and the following description, in which exemplary embodiments are explained in detail with the aid of schematic drawings.

In detail, the following show.

DETAILED DESCRIPTION

Figure 1:
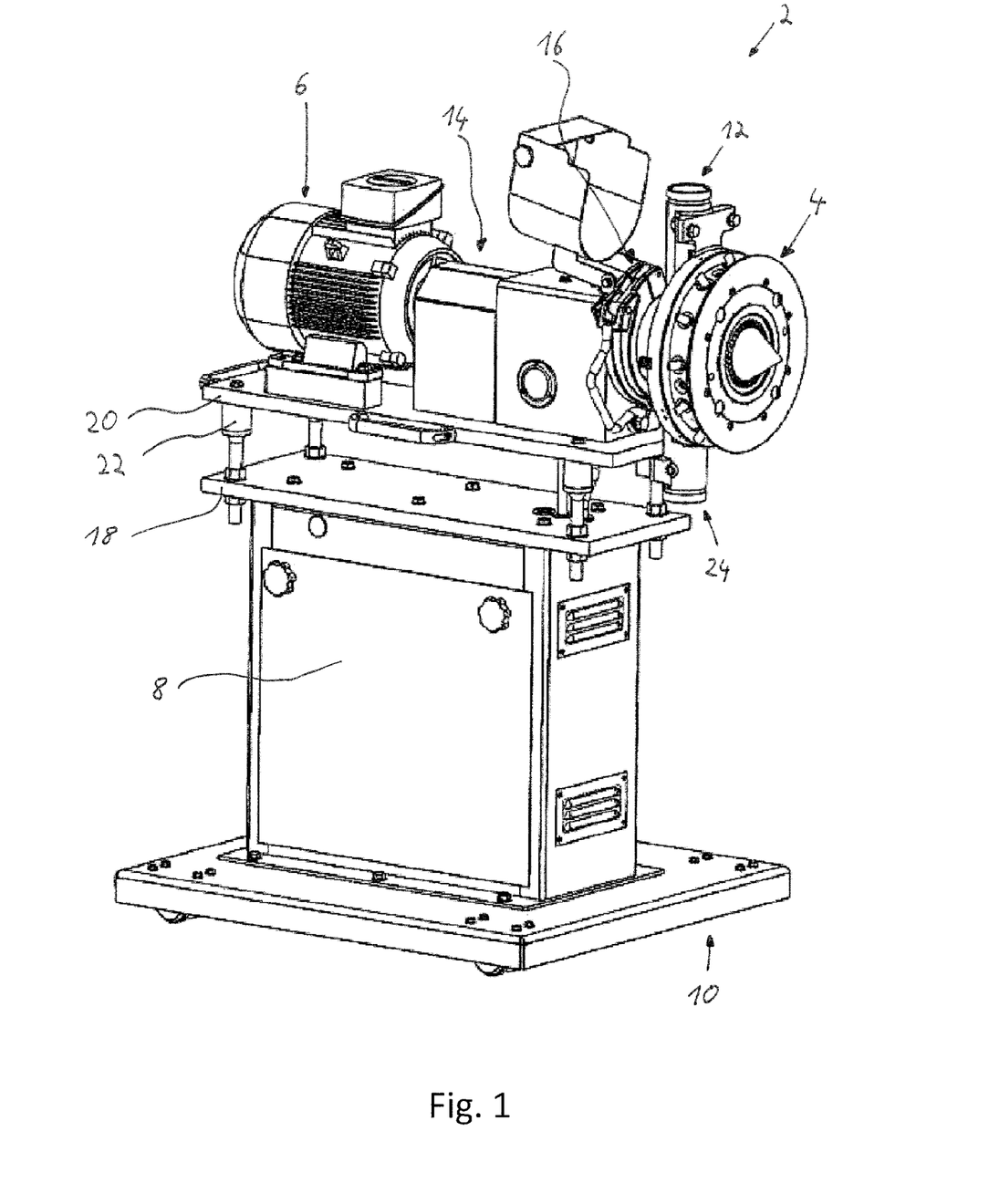
FIG. 1 a first exemplary embodiment of a granulator according to the invention with a nozzle arrangement according to the invention, in a perspective representation.

FIG. 1 shows a granulator 2 which is presently and preferably formed as an underwater granulator; however, the exemplary embodiments according to the invention may also be used in other granulators or granulating methods. The granulator 2 has a drive 6 which provides an underwater granulator 14 with drive power. This underwater granulator 14 is connected to a nozzle arrangement 4 by means of a coupling device 16.

Liquid plastic melt is supplied to the nozzle arrangement 4, typically from an extruder (not shown in Figures). The nozzle arrangement 4 is heated electrically or by means of a heating fluid. Furthermore, coolant fluid is introduced by means of a fluid inlet 12 into the nozzle arrangement 4 and leaves the same via a fluid outlet 24. The melt leaves the nozzle arrangement 4 in the form of melt strands (not shown in FIG. 1) in the direction of the underwater granulator 14 and is first split into strand sections by means of a cutting device (not shown); the cutting device is preferably designed with rotating cutting blades. In the underwater granulator 14, these melt strand sections come into contact with a coolant fluid, in particular water, and are cooled abruptly. As a result of this, the melt strand sections form granules and may be separated out of the water as granulates in the further course of the process.

The drive 6 serves in particular to drive the cutting device (not shown), which is provided to separate the melt strands into strand sections. The assembly from drive 6, the underwater granulator 14, as well as the nozzle arrangement 4 are arranged on a machine frame 20. This in turn is coupled by means of the spacer elements 22 to a base plate 18, which for its part is connected to a housing 8. The housing 8 is in turn arranged on a floor section 10, which for example has rollers for a simplified positioning capability of the granulator.

Figure 2:
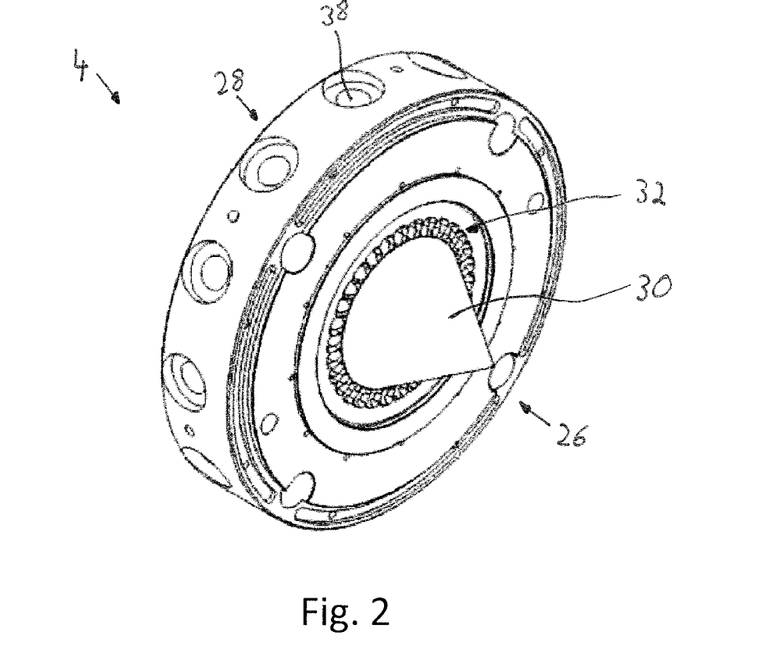
FIGS. 2 and 3 the exemplary embodiment of the nozzle arrangement according to the invention in accordance with FIG. 1, in perspective representations.
Figure 3:
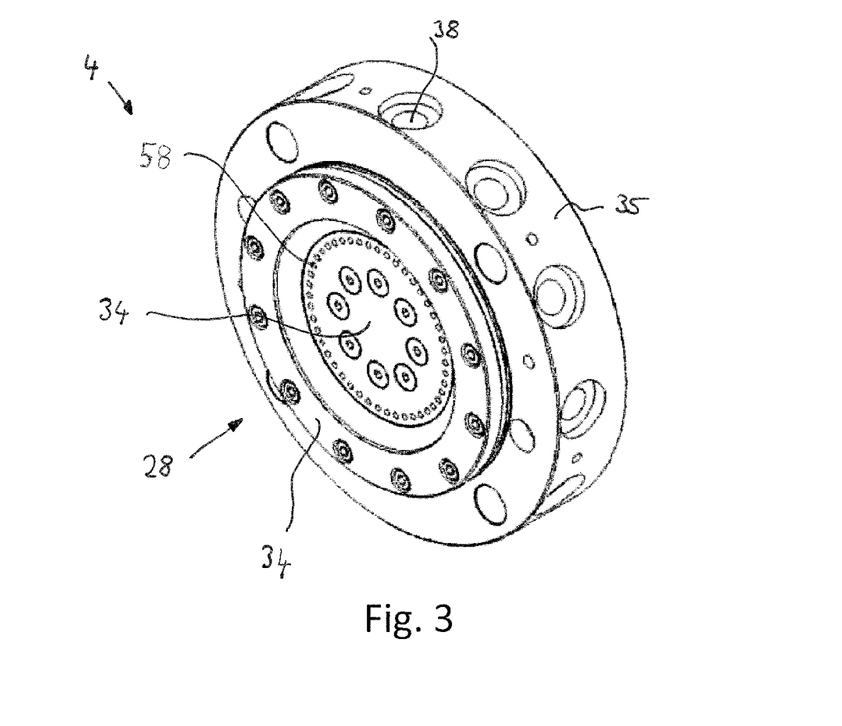

FIGS. 2 and 3 show the nozzle arrangement 4 shown in FIG. 1 in a state of separation from the granulator 2. Shown first in FIG. 2 is the inlet side 26 of the nozzle arrangement 4. A guide cone is arranged on the inlet side 26, which cone is primarily used to form an annular melt flow from a melt flow as is provided, for example, by a start-up valve arrangement (not shown here). The melt is guided by means of the guide cone 30 in the direction of the flow channels 32 which connect the inlet side 26 to the outlet side 28 in a fluid-conducting manner. The nozzle arrangement 4 further has heating element mounts 38 which are configured to heat the nozzle arrangement 4 by means of heating elements, in particular heating cartridges, to ensure that the supplied melt does not set unintentionally in the nozzle arrangement 4. It should be noted that the nozzle arrangement 4 may alternatively be heated by means of heating fluid, with steam, or by other means.

The outlet side 28 of the nozzle arrangement 4 is detailed in FIG. 3. Melt strands leave the nozzle arrangement 4 through the nozzle holes 58 of the nozzle plate 34, in the direction of a cutting device of an underwater granulator, for example (cf. FIG. 1). The nozzle plate 34 may, for example, be attached to a nozzle body 35 by means of an insulating ring 36. It should also be noted that the inner hole circle of the nozzle plate 34 is essentially used to attach the same to the nozzle body 35.

Figure 4:
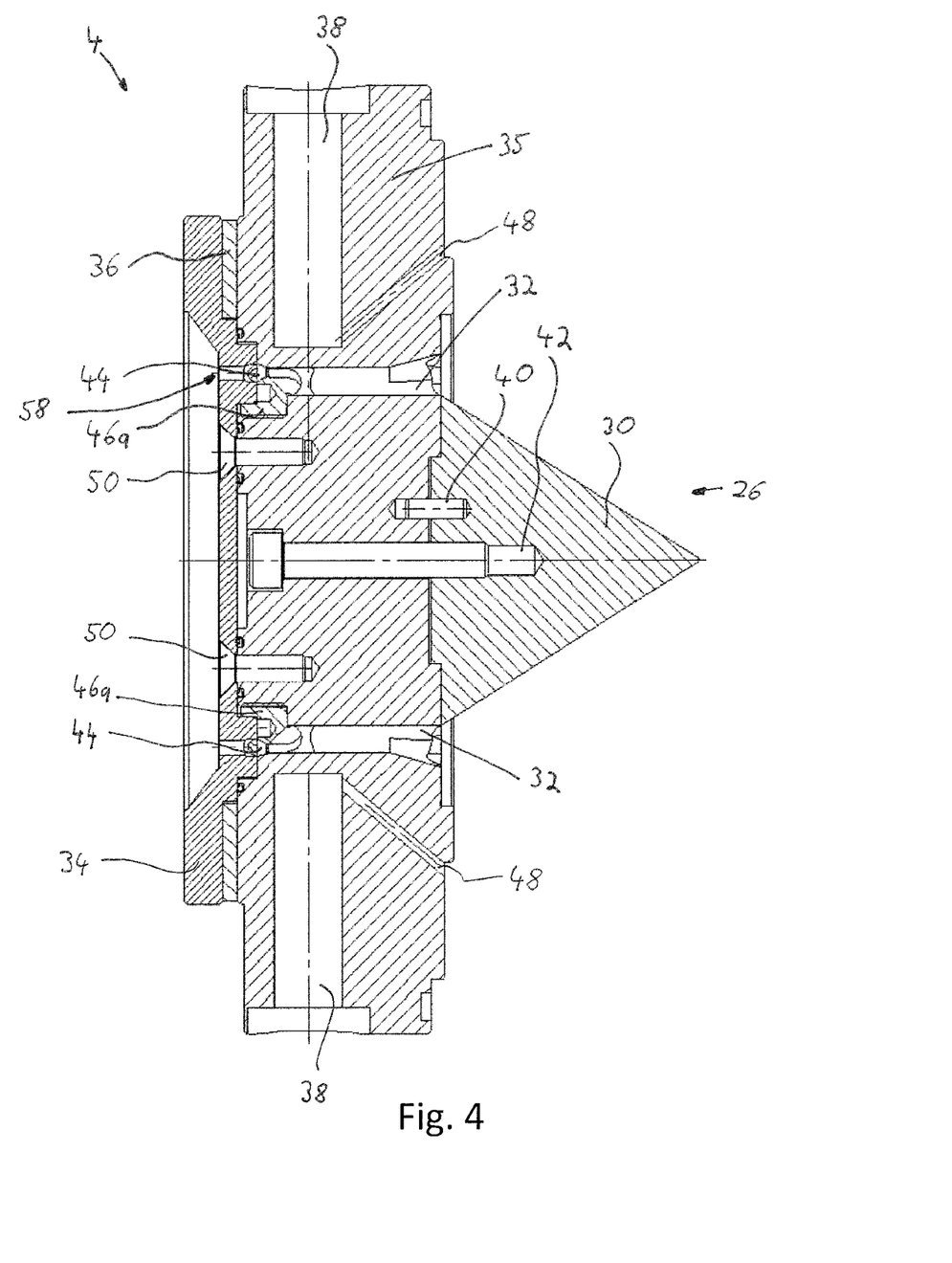
FIG. 4 the exemplary embodiment of the nozzle arrangement according to the invention in accordance with FIG. 1, in a sectional representation.

FIG. 4 shows a sectional view of the nozzle arrangement 4, wherein the section plane runs perpendicular to a longitudinal axis of the nozzle arrangement 4. The nozzle arrangement 4 has a nozzle body 35 in which are arranged heating element mounts 38 for accommodating heating elements for heating the nozzle arrangement. To facilitate the ability to insert a heating element or a heating cartridge into the heating element mounts 38, the nozzle body 35 has a vent hole 48. Furthermore, flow channels 32 are arranged in the nozzle body 35. These flow channels 32 are arranged in a circle around the longitudinal axis of the nozzle arrangement 4. The feed channels 32 are constricted in regions by a flow cross-section regulator 46. Furthermore, the flow channels 32 are connected to one another by means of an annular connection channel 44. Connected to the annular connection channel 44 in turn are the nozzle holes 58 of the nozzle plate 34. The annular connection channel 44 enables an almost arbitrary arrangement of the nozzle holes 58 in an area of the nozzle plate 34 which corresponds to the diameter of the annular connection channel 44.

The nozzle plate 34 is attached to the nozzle body 35 by means of the mounting bolts 50. Furthermore, an insulating ring 36 is introduced between the nozzle plate 34 and the nozzle body 35, at least in sections. A guide cone 30 is attached to the inlet side 26 of the nozzle arrangement 4 or of the nozzle body 35. The guide cone 30 is aligned or centered by means of an alignment pin 40 and bolted to the nozzle body 35 by means of a cone mounting bolt 42. As can be learned from FIG. 4, the flow cross-section regulator 46 is held in position by the nozzle plate 34. Different variants of the flow cross-section regulator 46 are available so that the flow cross-section regulator 46 may be swapped out depending on the material to be processed or of the melt to be processed. In the present case, only the nozzle plate 34 is to be removed to exchange the flow cross-section regulator 46, whereby the flow cross-section regulator 46 is immediately accessible and may be exchanged.

Figure 5:
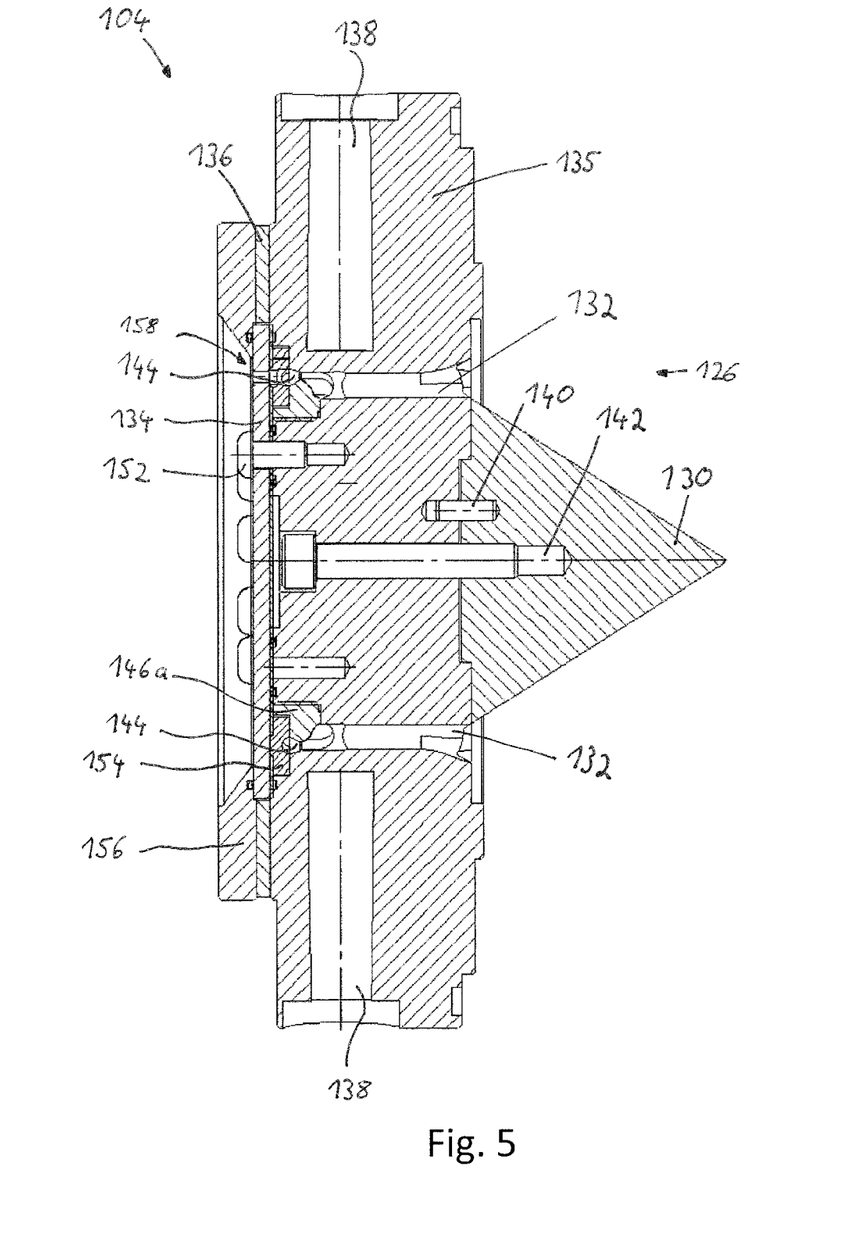
FIG. 5 a second exemplary embodiment of a nozzle arrangement according to the invention, in a sectional representation.

An alternative exemplary embodiment of a nozzle arrangement 104 is shown in FIG. 5. As already known from FIG. 4, the nozzle arrangement 104 also has a nozzle body 135 which has heating element mounts 138. Furthermore, a guide cone 130 is attached to the nozzle body 135 by means of an alignment pin 140 and cone mounting bolt 142. Moreover, flow channels 132 are formed in the nozzle body 135. The flow channels 132 run from the inlet side in the direction of the annual connection channel 144. A flow cross-section regulator 146a is again arranged in the area of the flow channel 132.

In the present case, the annular connection channel 144 is defined by both a nozzle body wall section as well as by wall sections that belong to a distributor ring 154 or the flow cross-section regulator 146a.

The nozzle plate 134 is connected to the annular connection channel 144 in a fluid-conducting manner. Said plate is reversibly connected to the nozzle body 135 by means of the nozzle plate mounting bolt 152. An insulating ring 136 is arranged around the nozzle plate 134. The arrangement comprising a nozzle plate 134 and an insulating ring 36 is ultimately held in position by a clamping ring 156. Once again, the circle or partial circle at which the nozzle holes 158 are arranged in the nozzle plate 134, corresponds to the diameter of the annular connection channel 144. Also, to this end the nozzle arrangement 104 is configured such that the flow cross-section regulator 146a may be easily exchanged, for example when the material to be processed or the melt to be processed is changed. The clamping ring 156 is to be removed in order to exchange the flow cross-section regulator 146a. The nozzle plate 134 is then accessible. After the nozzle plate mounting bolts are disengaged 152 and the nozzle plate 134 removed, including the distributor ring 154, the flow cross-section regulator 146a becomes accessible and can then be exchanged.

Figure 6:
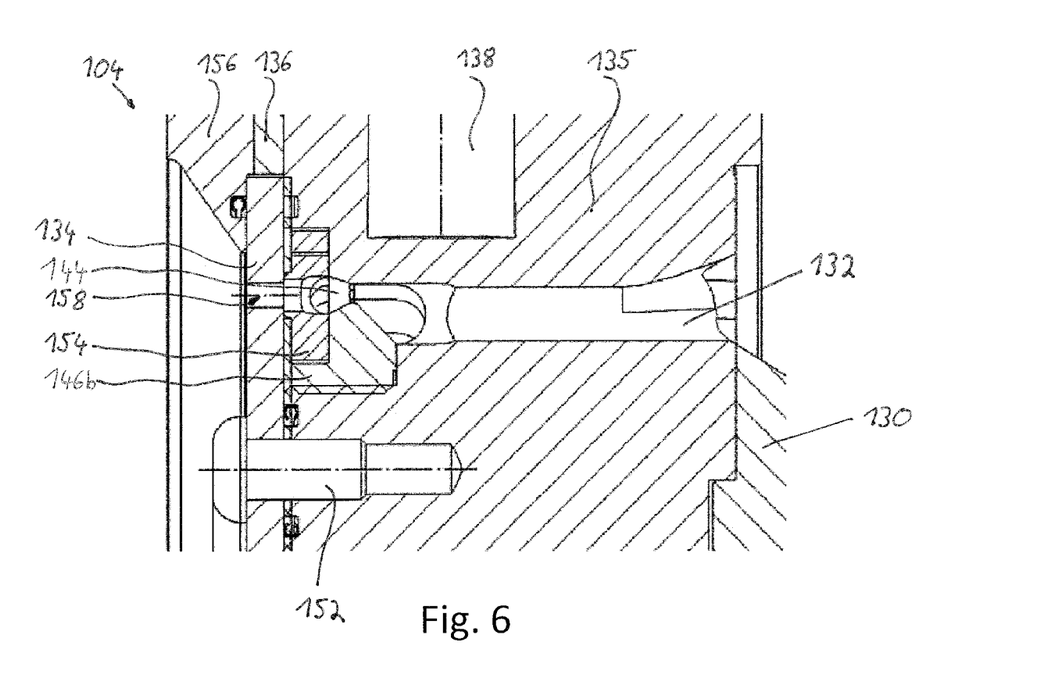
FIGS. 6 through 8 the exemplary embodiment of the nozzle arrangement according to the invention in accordance with FIG. 5, with differently formed flow cross-section regulators in sectional representations.
Figure 7:
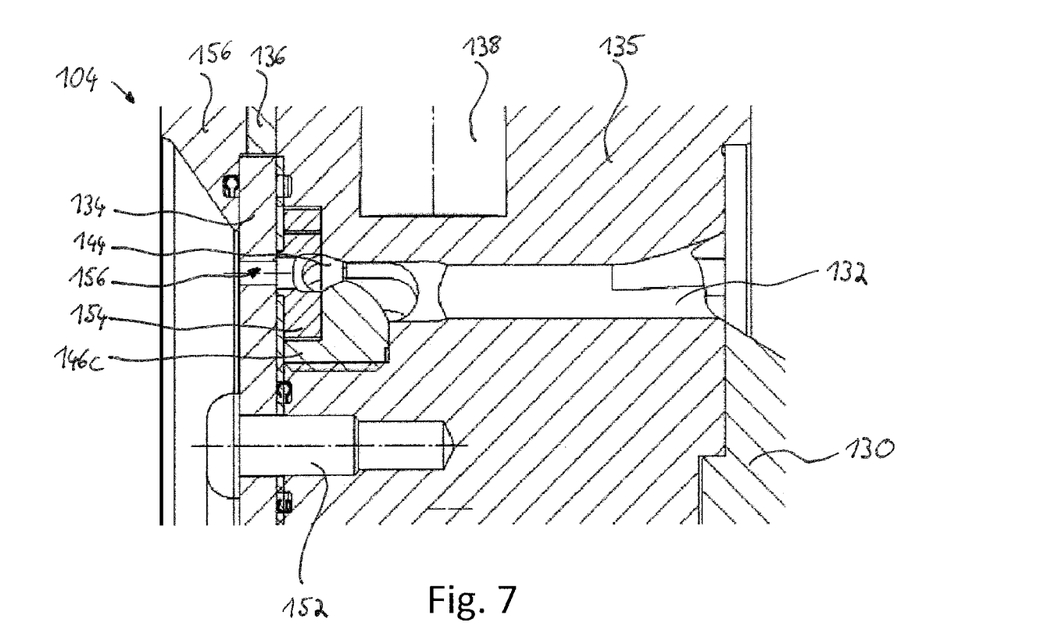
Figure 8:
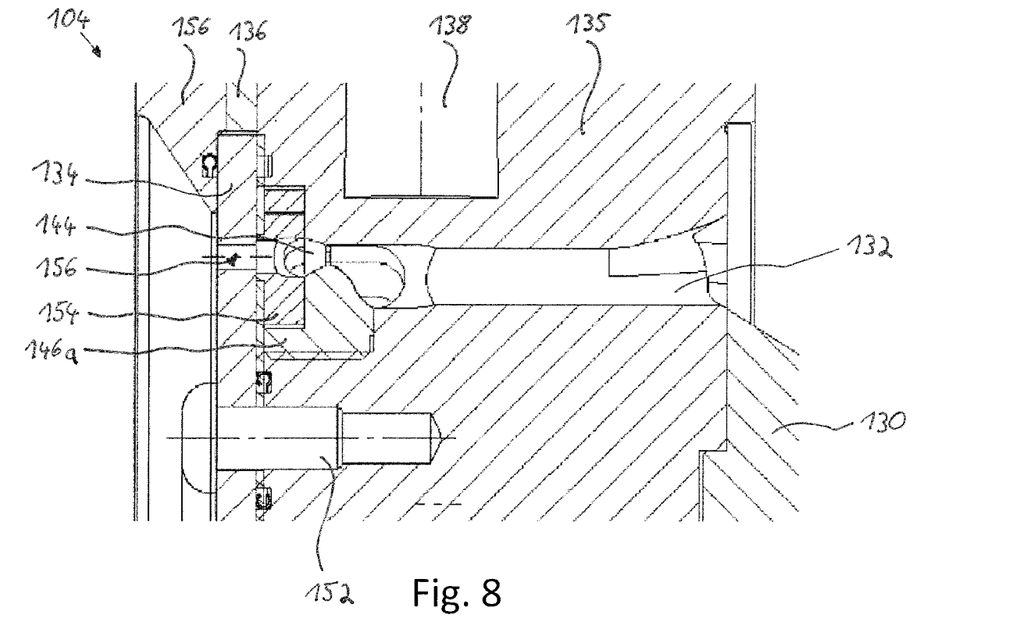

In FIG. 6 through 8, different flow cross-section regulators 146a-c are now arranged in the nozzle body 135 or in the flow channel 132.

In FIG. 6, the flow cross-section regulator 146b has an angled section for limiting the flow channel 132, whereas the flow cross-section regulator 146c in FIG. 7 has a curved section.

By contrast, in FIG. 8 the flow cross-section regulator 146a has an undulating section. The free flow cross-section of the flow channel 132, as well as indirectly the pressure of the melt in the area of the nozzle plate 134, can be influenced by means of the different designs of the flow cross-section regulators 146a-c as a function of the material to be processed.

Figure 9:
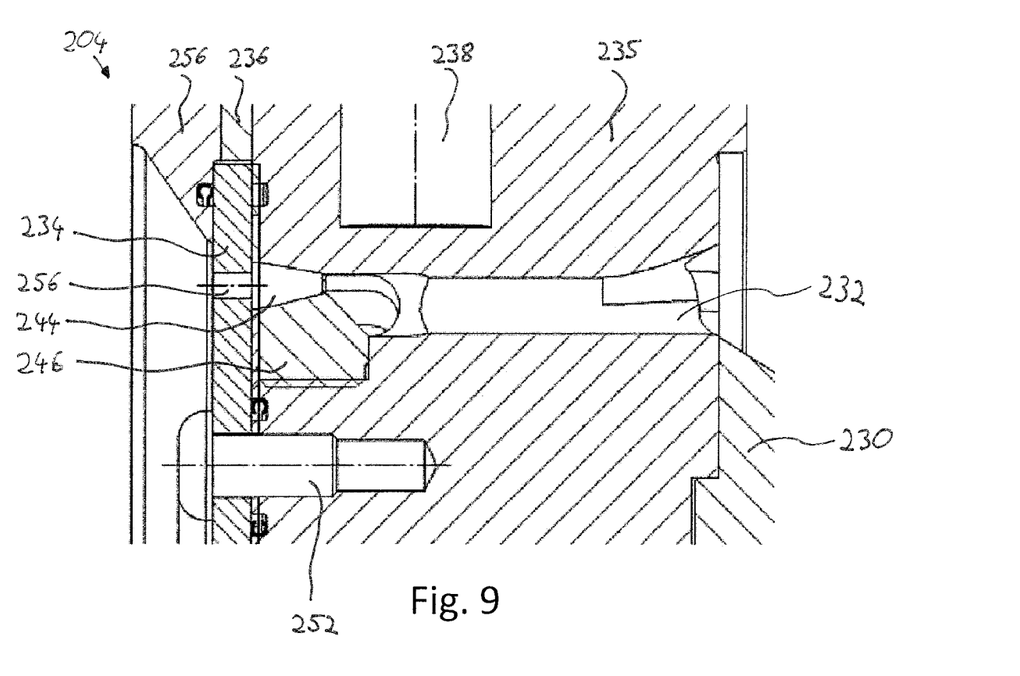
FIG. 9 a third exemplary embodiment of a nozzle arrangement according to the invention, in a sectional representation.

An alternative exemplary embodiment of a nozzle arrangement 204 is shown in FIG. 9. In contrast to the exemplary embodiment shown in FIG. 5 through 8, the nozzle arrangement 204 shown in FIG. 9 does not have a distributor ring but rather a flow cross-section regulator 246. The annular connection channel 244 is defined in the present case by the nozzle body 235, the flow cross-section regulator 246, as well as—at least slightly—by the nozzle plate 234 itself. In comparison with the exemplary embodiment shown in FIG. 5 through 8, the structural design of the nozzle arrangement 204 shown in FIG. 9 has otherwise not changed significantly.

Figure 10:
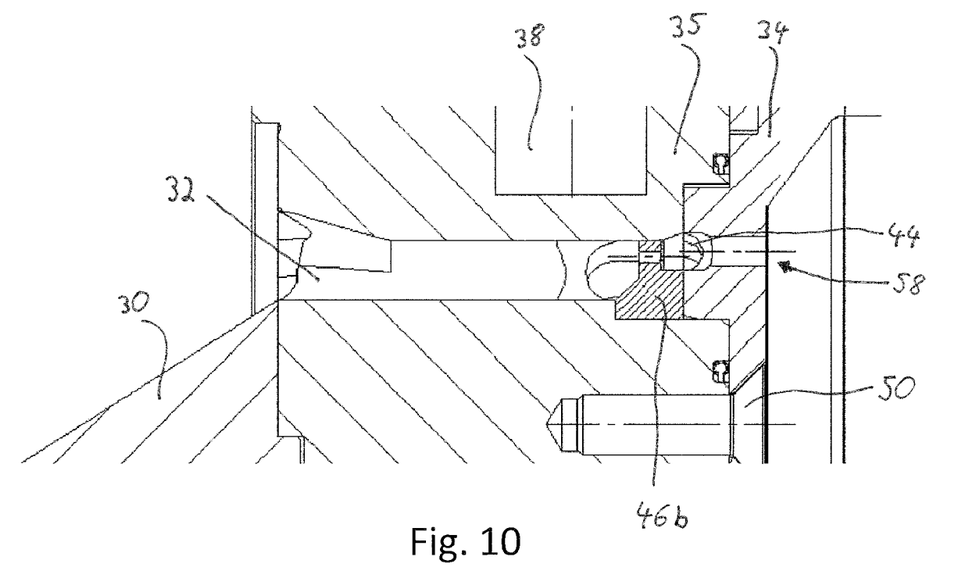
FIG. 10 through 14 the exemplary embodiment of the nozzle arrangement according to the invention in accordance with FIG. 1, with differently formed flow cross-section regulators in sectional representations.
Figure 11:
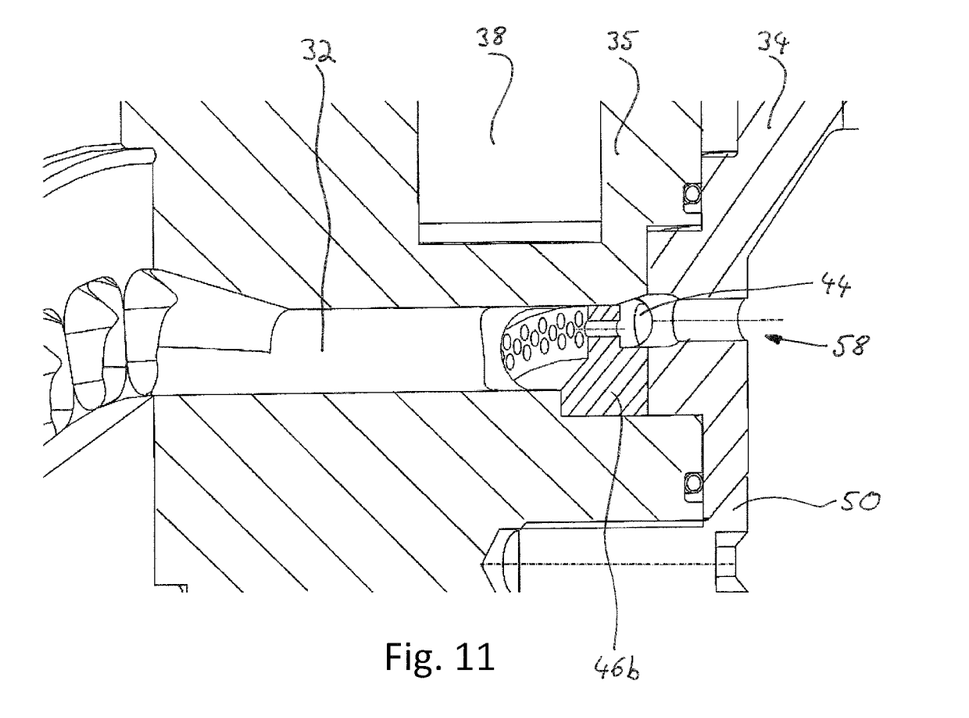

In FIG. 10 through 13, the exemplary embodiment of the nozzle arrangement 4 according to the invention in accordance with FIG. 1 is shown with differently formed flow cross-section regulators (46b-c), in sectional representations. In FIGS. 10 and 11, the flow cross-section regulator 46b is formed as a perforated flow cross-section regulator 46b. The free flow cross-section in the area of the flow cross-section regulator 46b is hereby influenced by the quantity, form and size of the perforations of the perforated flow cross-section regulator 46b.

Figure 12:
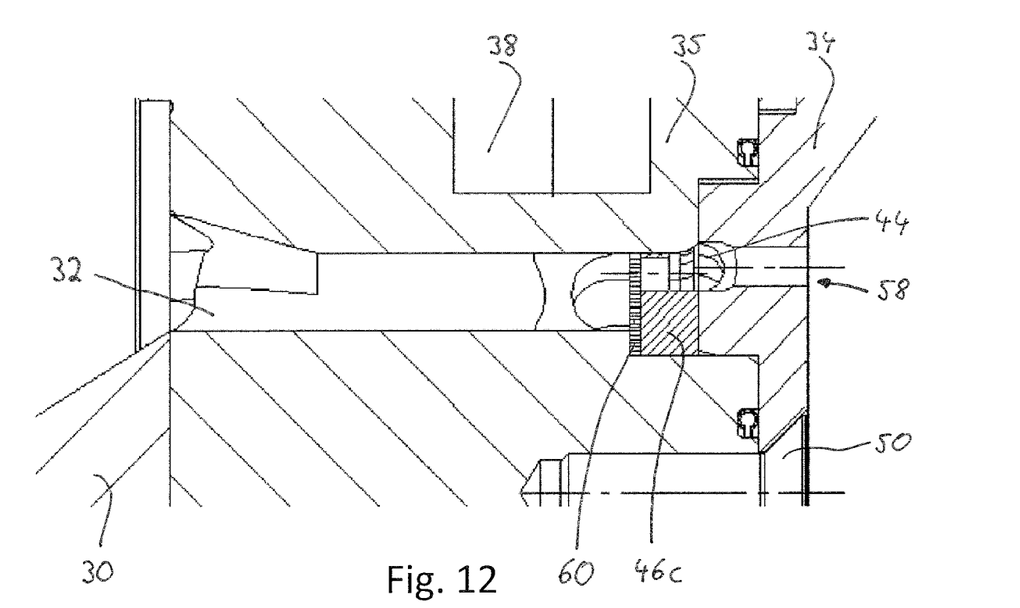
Figure 13:
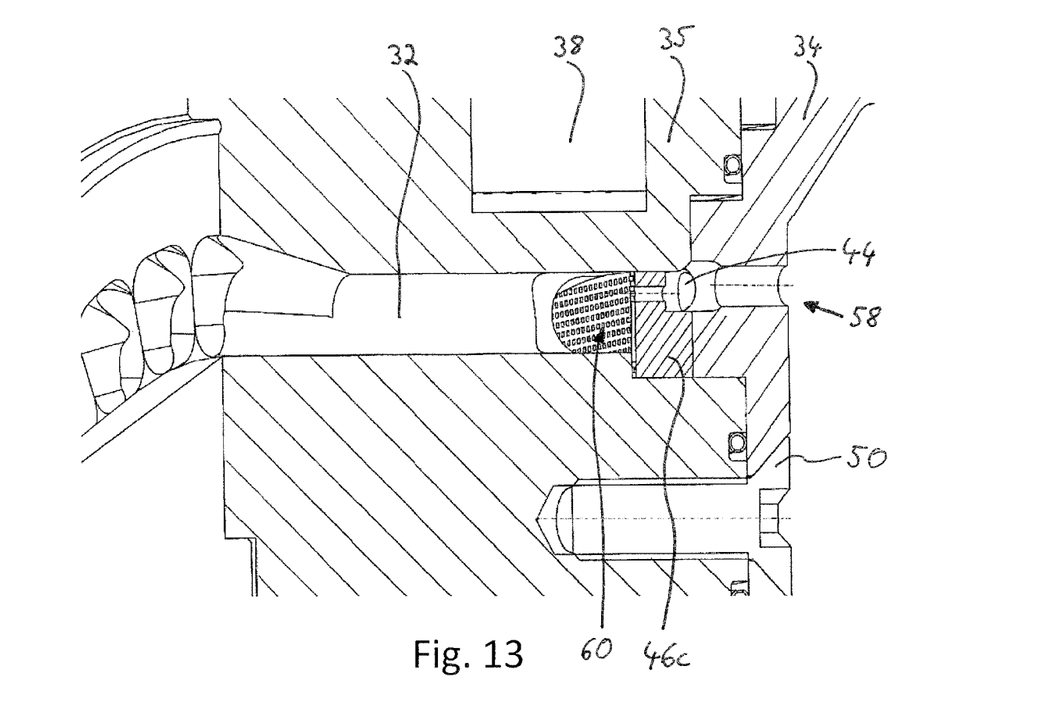

An alternative exemplary embodiment of a flow cross-section regulator 46c, formed as a perforated flow cross-section regulator 46c with wire netting 60 arranged thereupon, is shown in FIGS. 12 and 13. The wire netting 60 is arranged on the side of the perforated flow cross-section regulator 46c that faces the guide cone 30. The free flow cross-section in the area of the flow cross-section regulator 46c is influenced by the quantity, form and size of the perforations of the perforated flow cross-section regulator 46c, as well as by the nature of the wire netting, for instance the hole quantity and hole size.

Figure 14:
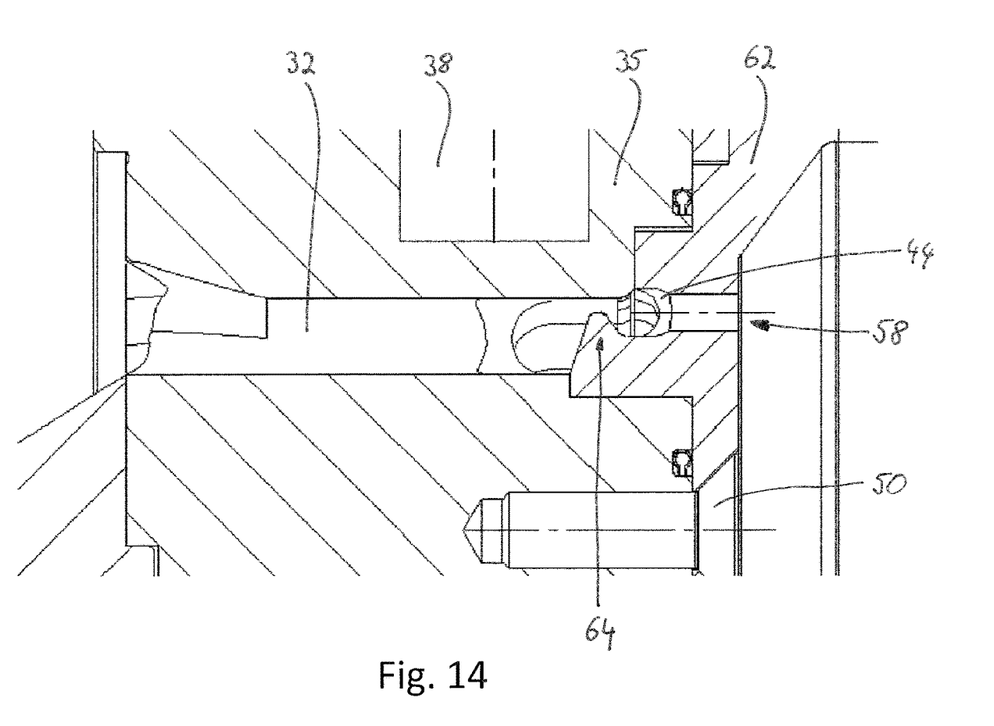
Figure 15:
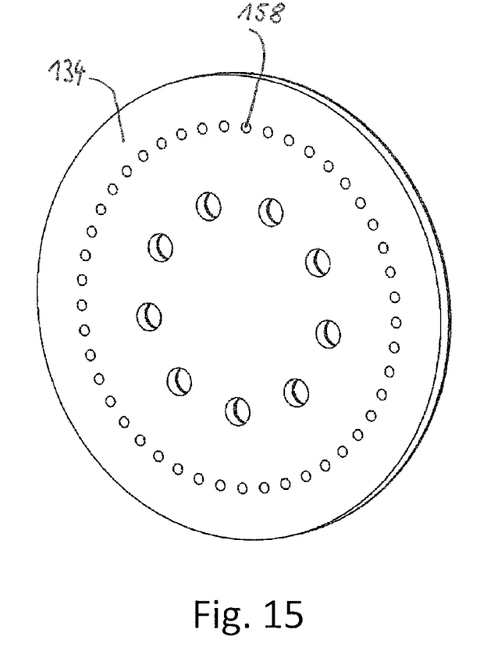
FIG. 15 through 18 nozzle plates with different hole configurations in perspective representations.
Figure 16:
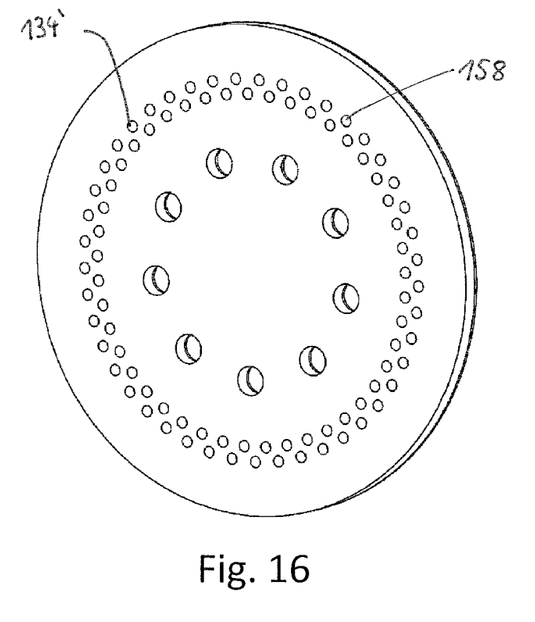
Figure 17:
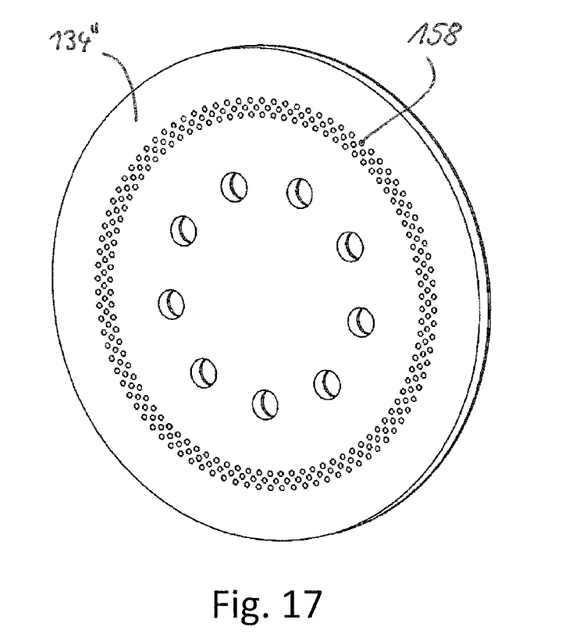
Figure 18:
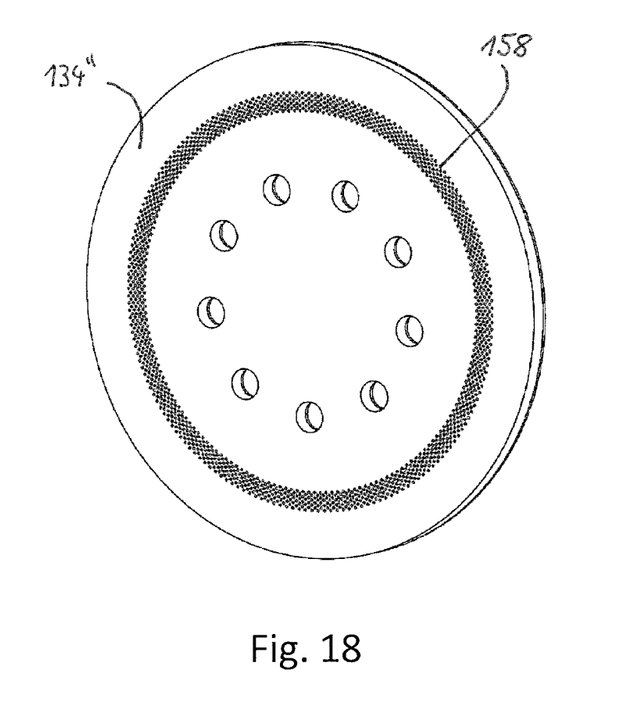

An alternative exemplary embodiment of a nozzle arrangement with a nozzle plate 62 having integrally molded flow cross-section regulator 64 is shown in FIG. 14. In this case, the flow cross-section regulator 64 is not executed as a separate component, but is instead part of the nozzle plate 62.

FIG. 15 through 18 show nozzle plates 134, 134', 134" and 134''', wherein the nozzle plates differ in terms of the quantity, positioning and diameter of the nozzle holes 158. It is clear from FIG. 11 through 13 that the nozzle holes 158, with respect to their size, position and quantity, can essentially be positioned freely on a circular ring around the midpoint of a nozzle plate 134 in that area which corresponds to the diameter of the annular connection channel 144 (cf. FIG. 5, for example).

What is claimed is:

1. A nozzle arrangement for a granulator, the nozzle arrangement comprising:
   a nozzle body with an inlet side and an outlet side;
   a nozzle plate with nozzle holes to form melt strands, said nozzle plate being arranged on the outlet side of the nozzle body,
   wherein a plurality of flow channels are formed in the nozzle body and extend from the inlet side and to the outlet side in a fluid-conducting manner for supplying melt flow to the nozzle plate; and
   at least one annular connection channel in fluid communication with both a flow channel of the plurality of flow channels of the nozzle body and the nozzle holes of the nozzle plate.

2. The nozzle arrangement of claim 1, wherein the connection channel is formed at least in sections in the nozzle body.

3. The nozzle arrangement of claim 1, wherein the connection channel has a circular cross-section.

4. The nozzle arrangement of claim 1, wherein a diameter of the connection channel corresponds to a circular nozzle hole diameter of the nozzle plate.

5. The nozzle arrangement of claim 1, further comprising at least one flow cross-section regulator arranged in at least one flow channel between the connection channel and the nozzle plate.

6. The nozzle arrangement of claim 5, wherein the flow cross-section regulator is integrally formed on the nozzle plate.

7. The nozzle arrangement of claim 5, wherein the flow cross-section regulator is formed as a separate component.

8. The nozzle arrangement of claim 5, wherein the flow cross-section regulator is arranged in the flow channel to be interchangeable.

9. The nozzle arrangement of claim 5, wherein the flow cross-section regulator is formed as a throttle ring element.

10. The nozzle arrangement of claim 5, wherein the flow cross-section regulator is arranged at least partially in or adjacent to the connection channel.

11. The nozzle arrangement of claim 5, wherein the flow cross-section regulator is held in position by the nozzle plate and is accessible after removal of the nozzle plate.

12. The nozzle arrangement of claim 5, further comprising a blocking edge formed at the flow cross-section regulator.

13. The nozzle arrangement of claim 5, wherein at least a section of the connection channel is formed at the flow cross-section regulator.

14. The nozzle arrangement of claim 5, further comprising a distributor ring arranged between the nozzle plate and the flow cross-section regulator, wherein a section of the connection channel is formed by the distributor ring.

15. The nozzle arrangement of claim 5, wherein the flow cross-section regulator has a conical section for limiting the flow channel.

16. The nozzle arrangement of claim 5, wherein the flow cross-section regulator has a curved section for limiting the flow channel.

17. The nozzle arrangement of claim 5, wherein the flow cross-section regulator has a concave section for limiting the flow channel.

18. The nozzle arrangement of claim 5, wherein the flow cross-section regulator is formed as a perforated flow cross-section regulator.

19. A granulator for preparing granulate from a melt flow, the granulator comprising the nozzle arrangement of claim 1.

20. The nozzle arrangement of claim 1, wherein all of the plurality of flow channels are connected to each other via the at least one annular connection channel.

21. The nozzle arrangement of claim 1, wherein the nozzle holes on the nozzle plate are arranged on the nozzle plate opposite a side of the nozzle plate that defines the annular connection channel, such that the arrangement of the nozzle holes corresponds to a diameter of the annular connection channel.

22. A nozzle arrangement for a granulator, the nozzle arrangement comprising:
 a nozzle body with an inlet side and an outlet side;
 a nozzle plate with nozzle holes to form melt strands, said nozzle plate being arranged on the outlet side of the nozzle body,
 wherein a plurality of flow channels are formed in the nozzle body and extend from the inlet side and to the outlet side in a fluid-conducting manner for supplying melt flow to the nozzle plate;
 at least one annular connection channel in fluid communication with both a flow channel of the plurality of flow channels of the nozzle body and the nozzle holes of the nozzle plate; and
 at least one flow cross-section regulator arranged in at least one flow channel between the connection channel and the nozzle plate,
 wherein the flow cross-section regulator is formed as one of: a throttle ring element and a perforated flow cross-section regulator.

\* \* \* \* \*